United States Patent
Kumar L S et al.

(10) Patent No.: US 10,950,198 B2
(45) Date of Patent: Mar. 16, 2021

(54) COMBINATION CIRCUITRY FOR MULTIPLE EMBEDDED DISPLAY TRANSMISSION PROTOCOLS

(71) Applicant: Intel Corporation, Santa Clara, CA (US)

(72) Inventors: Aruna Kumar L S, Bangalore (IN); Anoop Karunan, Bangalore (IN); Sanjib Basu, Bangalore (IN); Sunil Kumar C R, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 739 days.

(21) Appl. No.: 15/641,463

(22) Filed: Jul. 5, 2017

(65) Prior Publication Data

US 2019/0012981 A1    Jan. 10, 2019

(51) Int. Cl.
*G09G 5/00* (2006.01)
*H04L 29/06* (2006.01)
*G09G 5/36* (2006.01)
*G09G 3/20* (2006.01)
*H04L 7/00* (2006.01)

(52) U.S. Cl.
CPC ......... *G09G 5/006* (2013.01); *G09G 3/2096* (2013.01); *G09G 5/008* (2013.01); *G09G 5/363* (2013.01); *H04L 69/18* (2013.01); *G09G 2330/021* (2013.01); *G09G 2360/08* (2013.01); *G09G 2370/08* (2013.01); *H04L 7/0062* (2013.01)

(58) Field of Classification Search
CPC ............................... G09G 5/006; H04L 69/18
See application file for complete search history.

(56) References Cited

U.S. PATENT DOCUMENTS

| | | | |
|---|---|---|---|
| 9,503,288 B2 | 11/2016 | Kumar et al. | |
| 9,653,040 B2 | 5/2017 | Kumar et al. | |
| 9,697,792 B2 | 7/2017 | Venkatesan et al. | |
| 2015/0186091 A1* | 7/2015 | Kumar | G09G 5/006 345/204 |
| 2017/0041130 A1* | 2/2017 | Wiley | H04L 27/0002 |

\* cited by examiner

*Primary Examiner* — Zachary K Huson
(74) *Attorney, Agent, or Firm* — Alliance IP, LLC

(57) ABSTRACT

Embodiments include systems, devices, and methods for a combination CPHY/DPHY/eDP display transmission PHY. A CDE can include a MIPI display serial interface (DSI) circuitry configured to receive 8 bit data compliant with a DSI protocol and output a differential pair signal to a PISO circuit. The same data path is configured for incoming eDP data, which can be routed to circuitry configured to receive 10 bit data compliant with an eDP protocol and output a differential pair signal to a PISO circuit. The system can include a CPHY circuitry that includes a mapper circuit to map a 16 bit input to a 21 bit output, mapper circuit having three 7 bit outputs, and CPHY logic to output a trio. The MUX coupled to an output of the PISO is configured to output one of the eDP or the DSI or the CPHY data to an display driver.

24 Claims, 14 Drawing Sheets

COMBINATION CIRCUITRY FOR MULTIPLE EMBEDDED DISPLAY TRANSMISSION PROTOCOLS

FIELD

This disclosure pertains to computing system, and in particular (but not exclusively) to display transmission combination circuitry.

BACKGROUND

In system on chip (SOC) products, the display provides a visual user experience. There are three competing embedded display panel technologies. The Mobile Industry Processor Interface (MIPI) supports display serial interface (DSI) (using DPHY) and CPHY based displays. eDisplay Port (eDP) protocols are used for certain types of displays.

DETAILED DESCRIPTION

Figure 1:
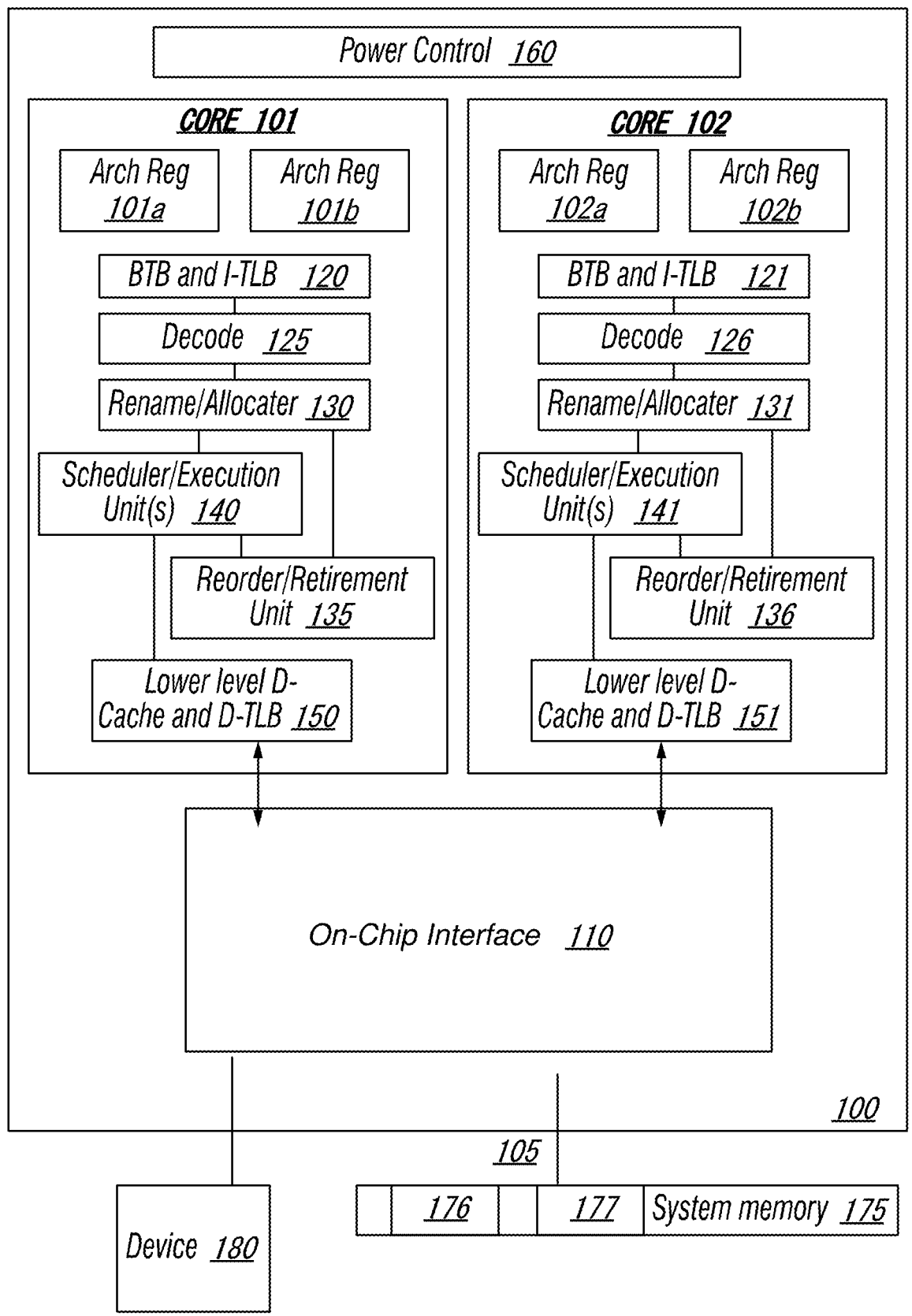
FIG. 1 illustrates an embodiment of a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

FIG. 1

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

This disclosure describes combining disparate PHY in to Single CDE (CPHY DSI eDP) PHY, which can be configured depending on the requirements and thereby providing greater flexibility to integrators to use any of the aforementioned types of displays. The system has configurability to adjust depending on the Display Ecosystem Dynamics. Along with the flexibility, Systems on Chip (SOC) available area will increase, and SOC design will also enjoy package pin count and execution benefits.

This disclosure describes circuits and logic architecture that addresses the area and cost aspect for a common CDE PHY supporting 8.1 Gbps eDP, 4.5 Gbps MIPI DSI and 3 phase based CPHY TX up to 2.5 Gbps. This disclosure describes an electrical over-stress handling scheme facilitating the merging of eDP and MIPI (High Voltage) PHYs.

Implementing separate designs for MIPI CPHY/MIPI DSI TX and eDP TX would translate to higher die area and also bumps/package pins along with higher leakage power. This would also require two parallel executions, increasing the costs in an already tight market segment.

In some embodiments, the combination PHY disclosed herein can result in a 32% reduction in area from the current scenario and 33% pin/bump savings along with package and board routing savings. Effectively 0.22 mm Square of die area reduction in 14 nm and ~0.12 mm square savings in 10 nm and 10 bumps/pins reduction which will add up to couple of cents (3-4 cents) savings.

Along with the cost benefits, aspects of the present disclosure facilitates the flexibility to choose the display interface of their choice. This means with the same die, the smartphone platforms can be built having MIPI as the display interface and the tablet platforms can be built having eDP as the display interface.

Figure 2:
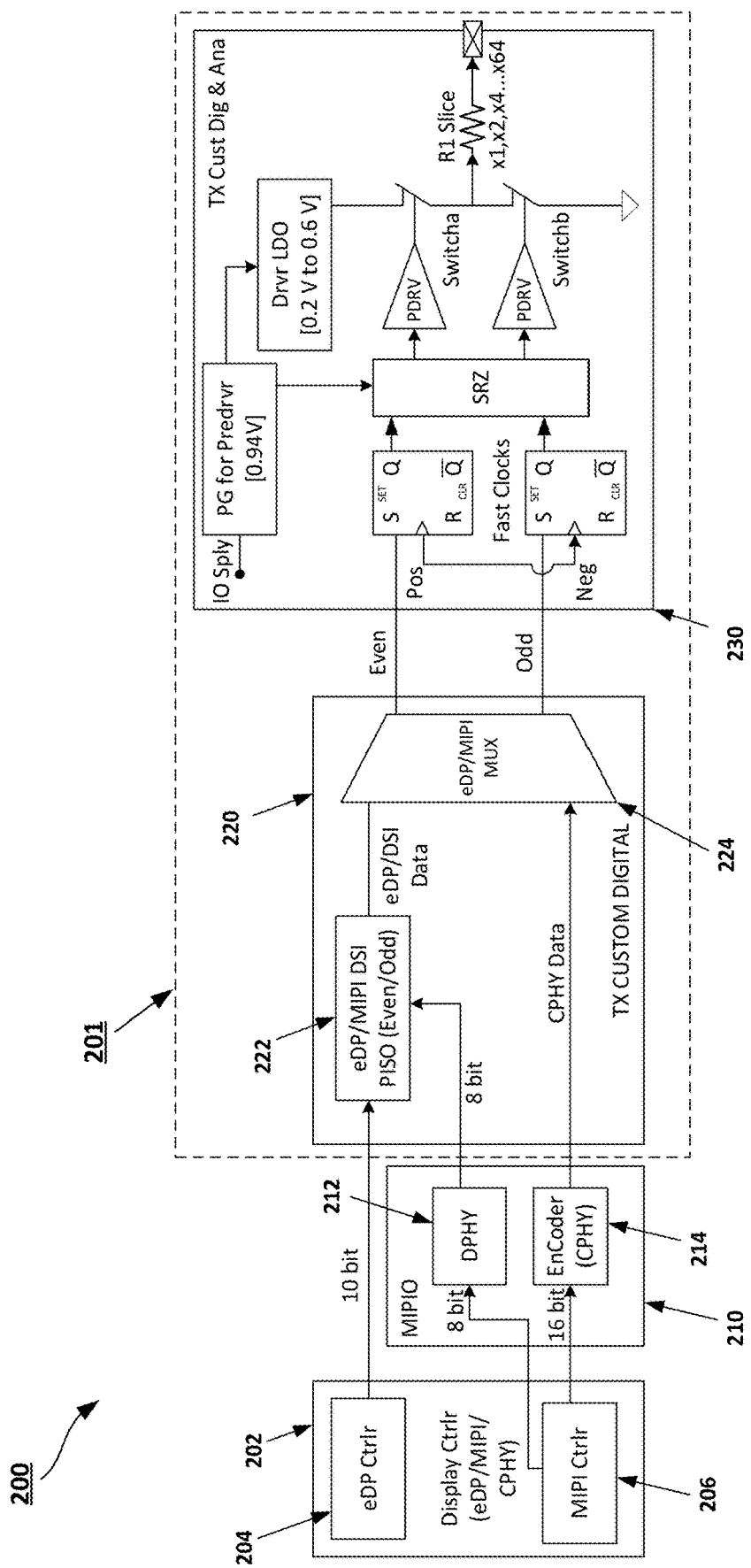
FIG. 2 is a schematic diagram of an example combination PHY for supporting multiple display types in accordance with embodiments of the present disclosure.

FIG. 2 is a schematic diagram of an example combination PHY 201 for supporting multiple display types in accordance with embodiments of the present disclosure. The combination PHY 201 architecture overcomes challenges of making eDP MIPI combination by innovative logic, circuitry and signal integrity solutions. A high level overview of the design is illustrated in FIG. 2.

FIG. 2 illustrates a system 200 that includes the combination PHY 201, the display controller 202, and MIPIO 210. The system 200 can include a display controller 202. The display controller 202 can include an eDP controller 204 and a MIPI controller 206. The combination PHY 201 can include a custom TX digital element 220 and an analog front end (AFE) 230.

The custom TX digital element 220 can include a parallel input to serial output (PISO) element 222. The eDP controller 204 can output 10 bits directly to the PISO 222.

The system 200 includes a MIPIO 210 that can receive 8 bit data into a DPHY 212 and 16 bit data into an Encoder (CPHY) 214. The DPHY data output 8 bit data to the eDP/MIPI/DSI PISO 222 in the custom TX digital element 220. The CPHY encoder 214 can output CPHY data directly to a multiplexer (MUX) 224. The PISO 222 can also output to the MUX 224. The MUX 224 can output even and odd data to the AFE 230.

The combination PHY 201 supports the following:
eDP high speed mode at the data rate of 8.1 Gbps: Differential TX;
MIPI DSI 2.0 high speed mode at the data rate of 1.5 Gbps to 4.5 Gbps mode; and
MIPI CPHY 3-phase high speed at the data rate of 2.5 Gbps: Single ended TX.

OEM requirements (eDP, MIPI DSI and MIPI CPHY based display) can be configured through graphics driver settings. The CRI bit from controller is used appropriately to process different protocol requirements.

The MIPI controller 206 can transmit 16 parallel data @ 562.5 MBps for 1 trio (3 signal wires). The system 200 can perform serialization in two stages. In the custom TX digital element 220, the 10 bit to 2 bit or 8 to 2 serialization can be performed through a configurable parallel input/serial putout (PISO) 222. There are Even and Odd 4:1 or 5:1 configurability which can be enabled depending on the eDP or DPHY mode.

Figure 3:
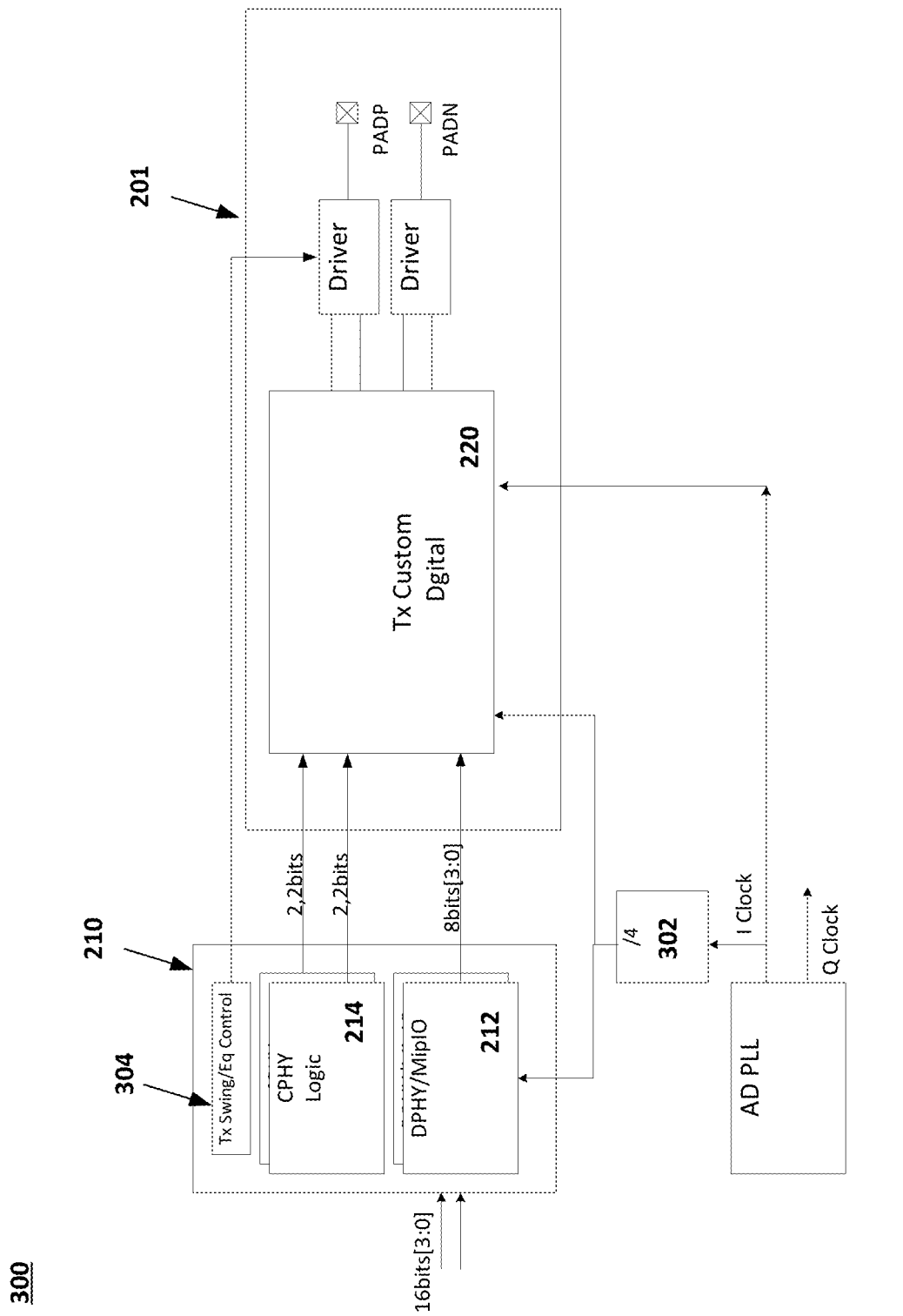
FIG. 3 is a schematic diagram of an example combination logic architecture in accordance with embodiments of the present disclosure.

FIG. 3 is a schematic diagram of an example combination logic architecture 300 in accordance with embodiments of the present disclosure. Logic architecture 300 provides a logical overview of the combination PHY 201, temporarily ignoring the eDP input. The logical architecture 300 shows that MIPIO 210 can have separate inputs for the CPHY and for the DPHY into the custom TX digital element 220. The logical architecture 300 also illustrates an input clock 302 that is used by the DPHY 212 and the custom TX digital element 220.

Also illustrated in FIG. 3 is that the CPHY logic 214 and the DPHY logic 212 can include a plurality of logical elements. For example, three CPHY logical elements can be used to form three trios (shown logically in FIG. 6, though only 2 trios are shown, for ease of illustration). Five DPHY logical elements 212 can be used to use 10 wires into the custom TX digital element 220.

Figure 4:
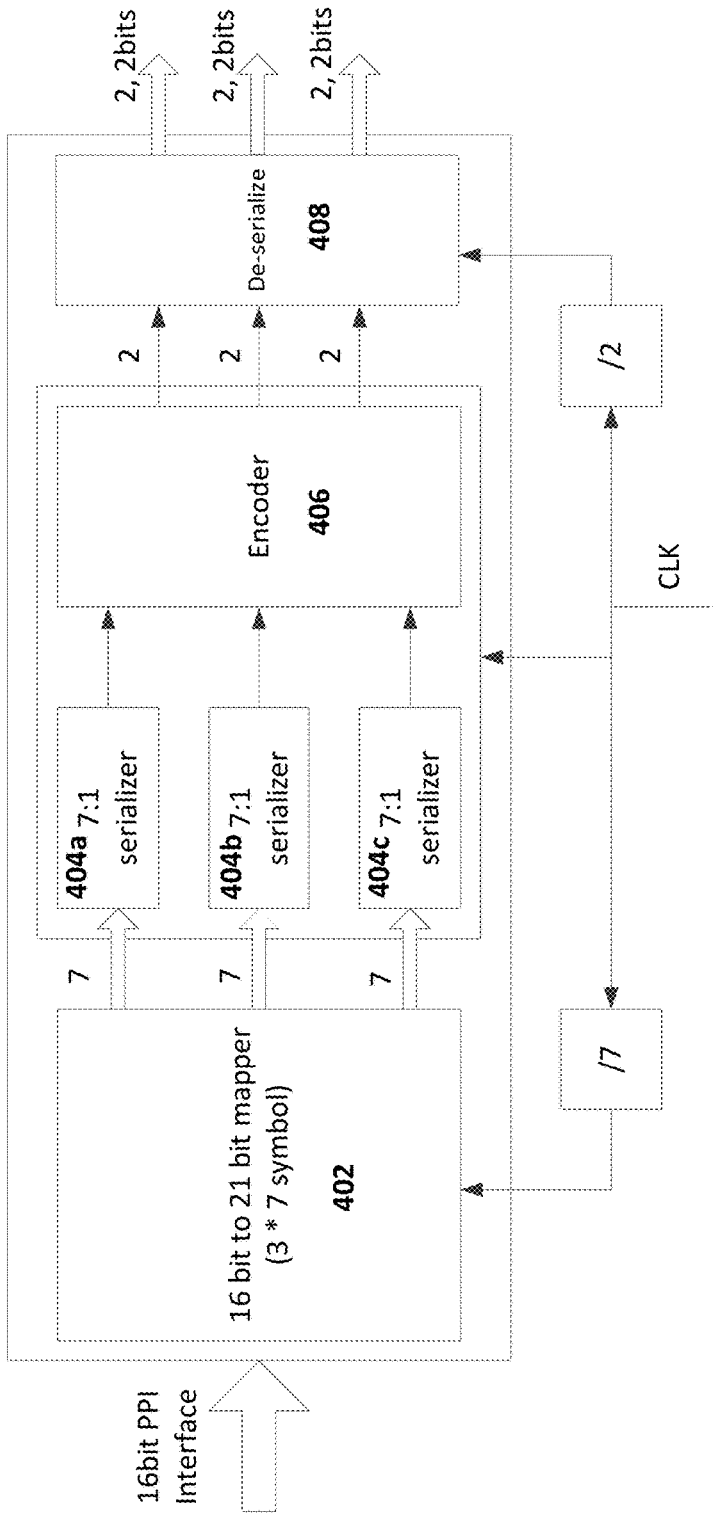
FIG. 4 is a schematic diagram of a CPHY logic in accordance with embodiments of the present disclosure.

FIG. 4 is a schematic diagram of a CPHY logic 214 in accordance with embodiments of the present disclosure. CPHY logic 214 uses three-phase symbol encoding of about 2.28 bits/symbol to transmit data symbols on three-wire lanes, or "trios", where each trio includes an embedded clock. Three trios operating at 3.5 Gsym/s achieve a peak data rate of about 24 Gbps over a nine-wire interface.

The CPHY logic 214 includes a 16 to 21 mapper 402. The 16 to 21 mapper 402 inputs the 16 bits from the MIPI controller 206 and outputs 3 7 bit outputs. The CPHY logic 214 also three 7:1 serializer 404a-404c and encoder 406. This CPHY encoder 406 outputs to a deserializer 408 to send for each trio 2 bits of swing and 2 bits of Even and Odd. To achieve 3 different swing levels for CPHY, equalization logic 304 (shown in FIG. 3) is used to obtain 100 mV, 200 mV and 300 mV. There is common 2 to 1 serialization is implemented in a transmission analog front end, as this will be operating at 1.25 GHz, 2.25 GHz & 4.05 GHz clock respectively for facilitating CDE. Hence eDP/MIPI PISO 222 is bypassed for CPHY mode but final 2 bit 1 Serialization and retiming is done to throughput 2.5 Gbps on to the pads.

The eDP/DPHY are differential interfaces and CPHY is a 3 phase based design and there are 3 trios. For MIPI DSI and eDP data path there will be no encoding required. Parallel in Serial Out (PISO) functionality is taken in two stages: one in the logic which serializes 10 bit data in to 2 bits (even and odd). This output is directly fed into the AFE for the final serialization, bypassing the encoder. For CPHY, the serialization outputs are fed to an encoder 406 and the encoded data along with the appropriate swing control settings (for three levels) are passed in to AFE. Logical Data mapping for multiple lanes is shown in FIGS. 6 and 7.

Figure 5:
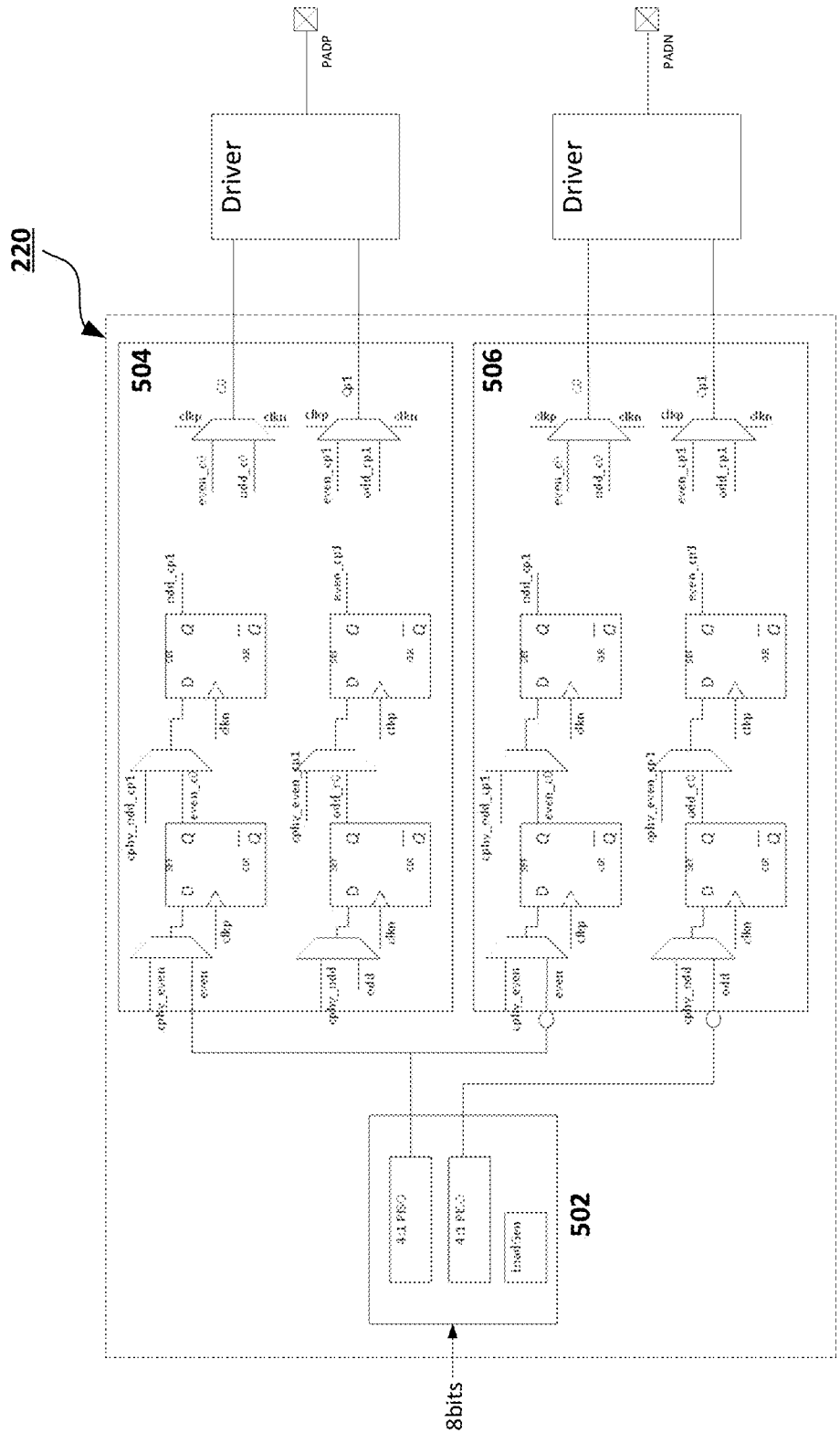
FIG. 5 is a schematic diagram of an example logic for a custom TX digital element in accordance with embodiments of the present disclosure.

FIG. 5 is a schematic diagram of an example logic for a custom TX digital element 220 in accordance with embodiments of the present disclosure. The custom TX digital element 220 includes an input (8 bit for DPHY and 10 bits for eDP) that receives DPHY or eDP signals into a PISO 502. The PISO 502 can include separate serializers for even and odd inputs. The PISO 502 can output to multiplexer circuit 504 and multiplexer circuit 506. Noteworthy is that the input from the CPHY is fed directly to the multiplexer circuits 504 and 506.

The multiplexer circuit 504 can include MUXes that include selection inputs to output one of the CPHY or DPHY/eDP inputs. The multiplexer circuit 504 also includes a D-Latches or other equivalent logical elements.

Figure 6:
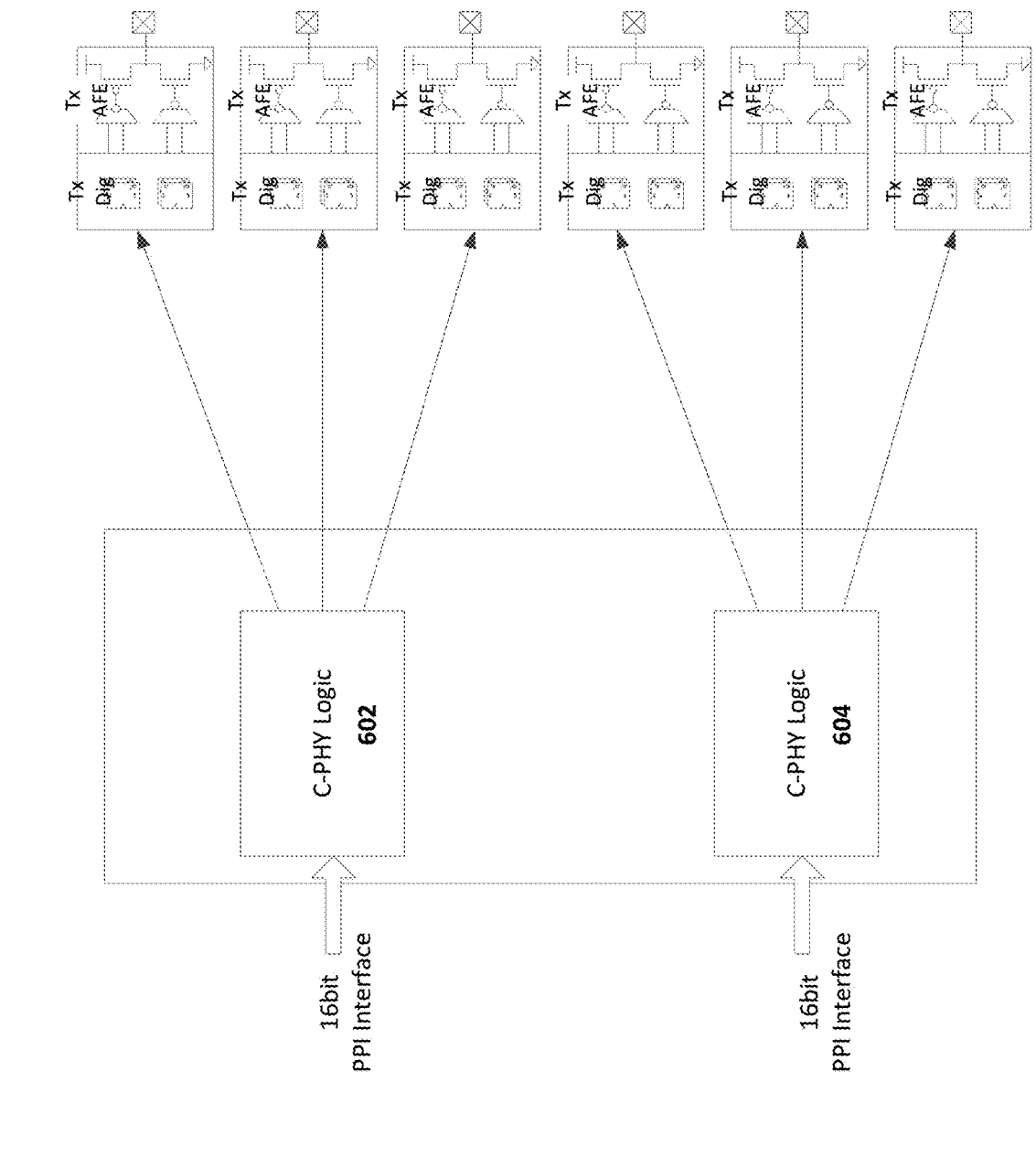
FIG. 6 is a schematic diagram of a logical data mapping for a CPHY mode of operation in accordance with embodiments of the present disclosure.
Figure 7:
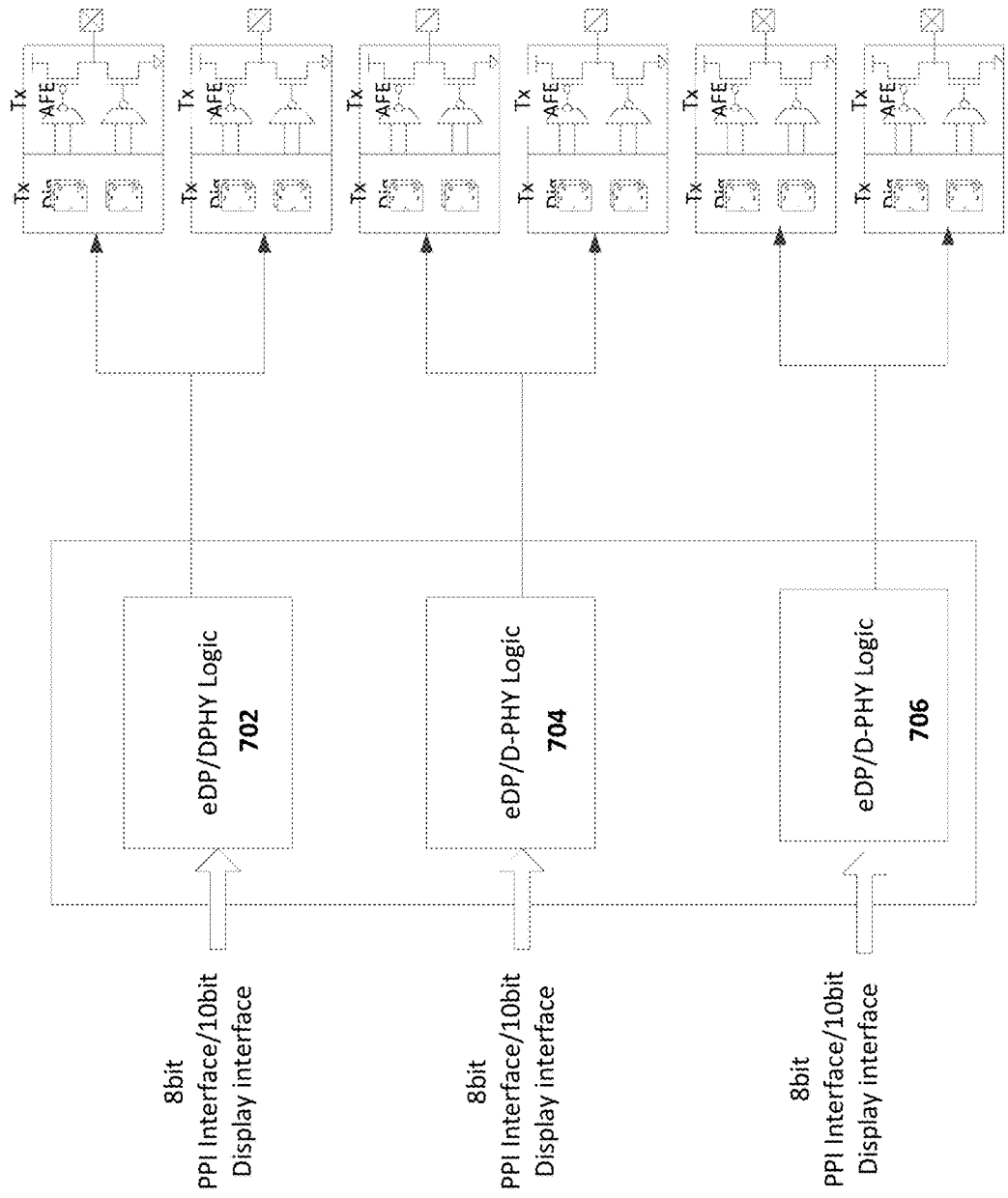
FIG. 7 is a schematic diagram of a logical data mapping for an eDP/DPHY mode of operation in accordance with embodiments of the present disclosure

FIG. 6 is a schematic diagram of a logical data mapping 600 for a CPHY mode of operation in accordance with embodiments of the present disclosure. In FIG. 6, two CPHY logical elements 602 and 604 are shown, but only for ease of illustration. A third CPHY logical element is also present to form three trios fed into the custom TX digital element 220. FIG. 7 is a schematic diagram of a logical data mapping 700 for an eDP/DPHY mode of operation in accordance with embodiments of the present disclosure. The eDP/DPHY logic can feed differential pairs into the custom TX digital elements, even though the same custom TX digital elements and AFEs are used. In FIG. 7, only three eDP/DPHY logical elements are shown (as logical elements 702, 704, and 706), but it is understood that more than three eDP/DPHY logical elements can output differential pairs to the custom TX digital element. The system supports 5 differential pairs.

The data flow is summarized in below Table 1.

LPTX includes MIPI LP drivers 826 (configured in P) and MIPI LP driver 828 (configured in N).

The AFE 800 also includes electrostatic discharge (ESD) protection circuitry 816 to protect the channels to the PADS 812 and 814.

A Power Gate (PG) 818 is used to support power down states, where during low power modes the PG is turned off which brings down the leakage to few µA, thereby supporting low power MIPI Applications. An low drop out (LDO) 820 with an output voltage range of 200 mV to 600 mV is used, where 400 mV swing option is used for MIPI CPHY/DSI and variable swings is used for eDP. For swings greater than 600 mV for eDP, the LDO 820 is bypassed and driver 824 is configured in N Opposing mode to achieve swings lesser than supply voltage.

Figure 9:
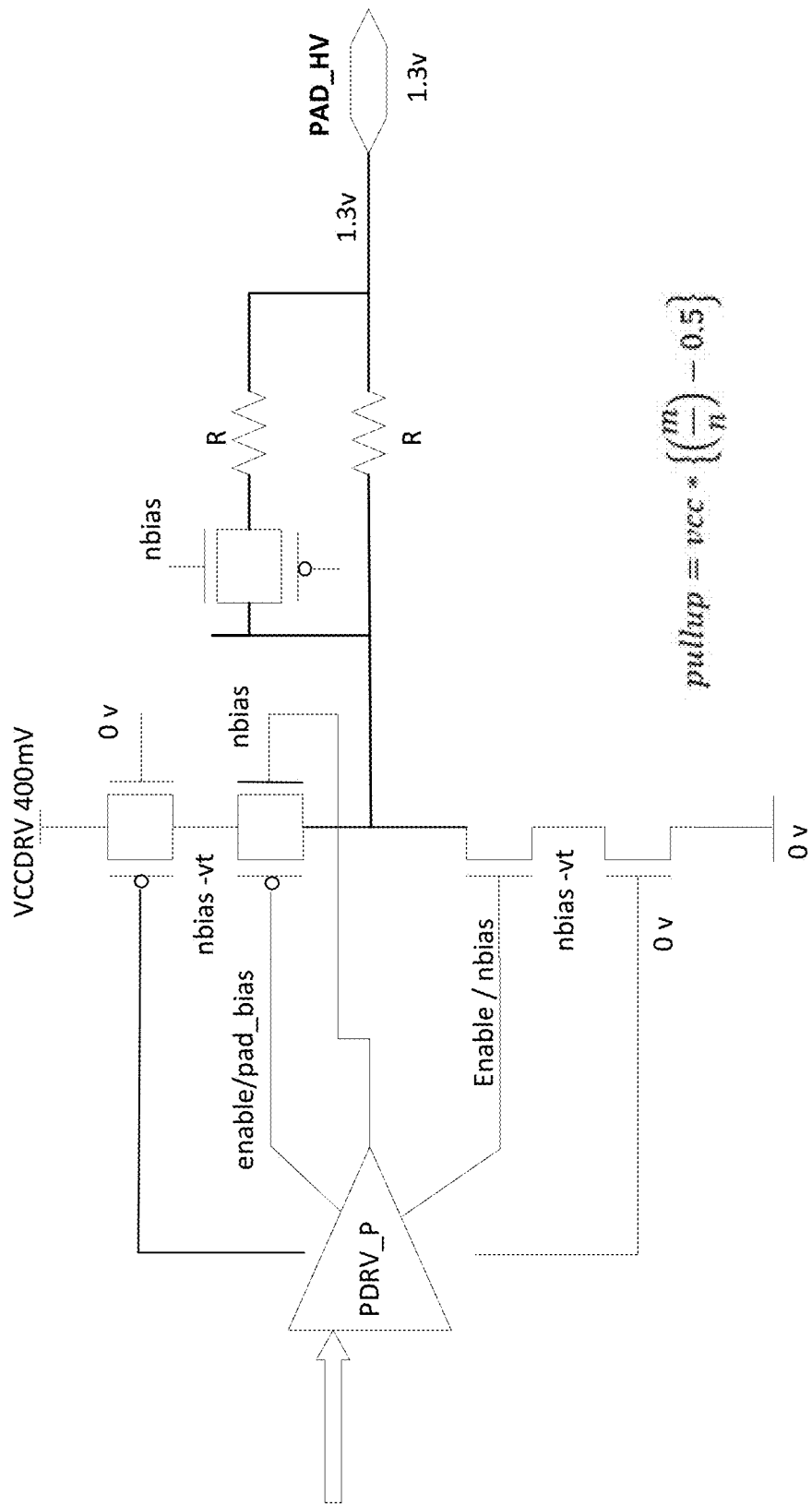
FIG. 9 is a schematic diagram of an example driver circuit implementation supporting eDP, MIPI DSI and CPHY based transmission in accordance with embodiments of the present disclosure.

FIG. 9 is a schematic diagram of an example driver circuit implementation 900 supporting eDP, MIPI DSI and CPHY based transmission in accordance with embodiments of the present disclosure. FIG. 9 shows the HSTX driver slice circuit implementation 900 with electrical over-stress (EOS) protection elements during MIPI RX mode in MIPI DSI configuration. For a complete driver, multiple slices are used to achieve impedance calibration across process, temperate, and voltage variations (PVT), and also to support equalization, lower swings through opposing modes. In order to

TABLE 1

| Data Flow | Controller output width | Controller output bandwidth MBPs | Custom Digital output width | Custom Digital output bandwidth MBPs | AFE Output Width | AFE output bandwidth MBPs | Effective Bandwidth per PORT GBPs | Comments |
|---|---|---|---|---|---|---|---|---|
| CPHY trio | 16 | 714 | 6 | 1250 | 3 | 5666.7 | 17.1 | 2.28 is the factor because of 3 phase |
| DPHY diff pair | 8 | 562.5 | 2 | 2250 | 2 | 4500 | 18 | 1 clock lane will result in 20% bandwidth loss |
| eDP diff pair | 10 | 810 | 2 | 4050 | 2 | 8100 | 25.92 | 8b10b encoding results in 20% bandwidth |

Figure 8:
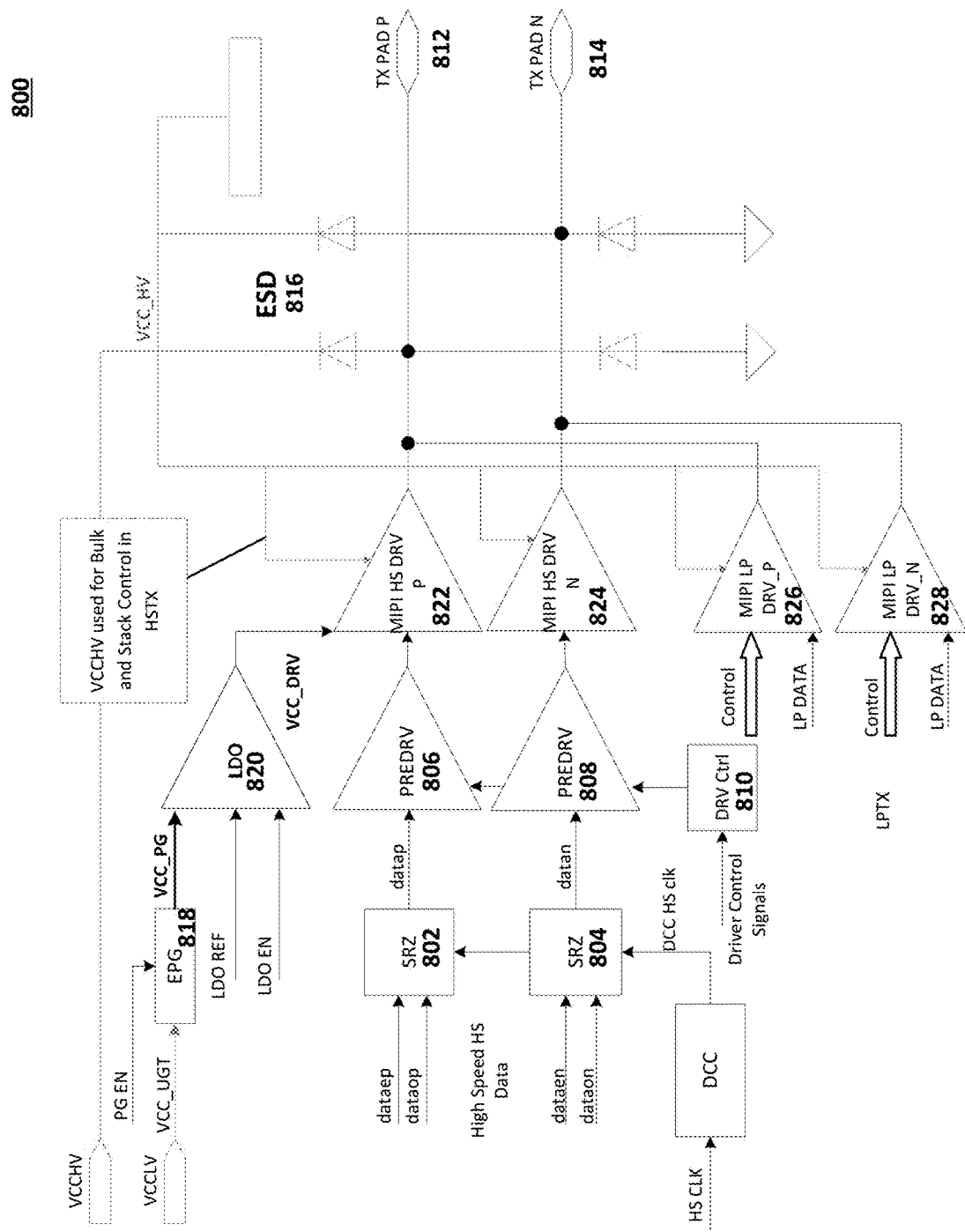
FIG. 8 is an example analog front end architecture supporting eDP, MIPI DSI and CPHY Based transmission in accordance with embodiments of the present disclosure.

FIG. 8 is an example analog front end architecture 800 supporting eDP, MIPI DSI and CPHY Based transmission in accordance with embodiments of the present disclosure. The circuit block consists of high speed driver path (HSTX) which is common for all 3 protocol PHY layers (CPHY, DSI and eDP) and also consists of a high voltage (1.2V) based low power transmitter (LPTX) to support MIPI side band communications. HSTX is designed to support a max data rate of 8.1 Gbps with differential signaling. The data path is isolated for PAD_P and PAD_N so that the HSTX can be configured as below:

Two single ended drivers to support CPHY;
One differential transmitter to support MIPI DSI and eDP.

The Data path consists of 2 independent serializers 802 and 804, which are sourced with MIPI DSI/eDP data from Parallel In Serial Out (PISO) whose outputs are muxed with CPHY data as explained above. The outputs of serializer 802 and 804 are full data rate signals passed through Pre-drivers 806 and 808, respectively, to drive final driver switches. The driver control block 810 controls the HSTX and LPTX states in order to avoid contention on TX PADs 812 and 814. When HSTX is functional, LPTX is kept at high Impedance mode (HiZ) and similarly when LPTX is functional HSTX is placed in HiZ mode by driver control logic 810.

support high speed, the driver is designed with thin gate switches. The slice consists of 2 or 3 resistors depending upon unit slice, which are connected in parallel with in the slice based on compensation codes.

High speed driver switches are made of pass gate structures to support different output swings for MIPI swing settings. A pull up NMOS switch out of the pass gate will be completely turned on as source voltage will be in the range of 400 mV. For eDP swing of 700 mV, the pass gate switch will be turning on and off. HSTX swing waveform for MIPI DSI and eDP can be 400 mV.

To support MIPI LP mode, single ended LPTX are coupled to the same high speed pads, as shown in FIG. 8. As all the drivers mentioned above are sharing the same pads, electrical over stress on thin gate devices is a concern. Low power TX outputting maximum voltage can go as high as 1.3V, which will violate the GATE to DRAIN/SOURCE spec of the thin gate drivers. To overcome this, NMOS switch gates are connected to NBIAS, which is equal to vcc/2. And the PMOS gates are connected to pad tracking circuit, which tracks the pad voltage (1.3V) and connects the PMOS gates to same voltage (1.3V), thereby turning off the PMOS for EOS protection.

Figure 10:
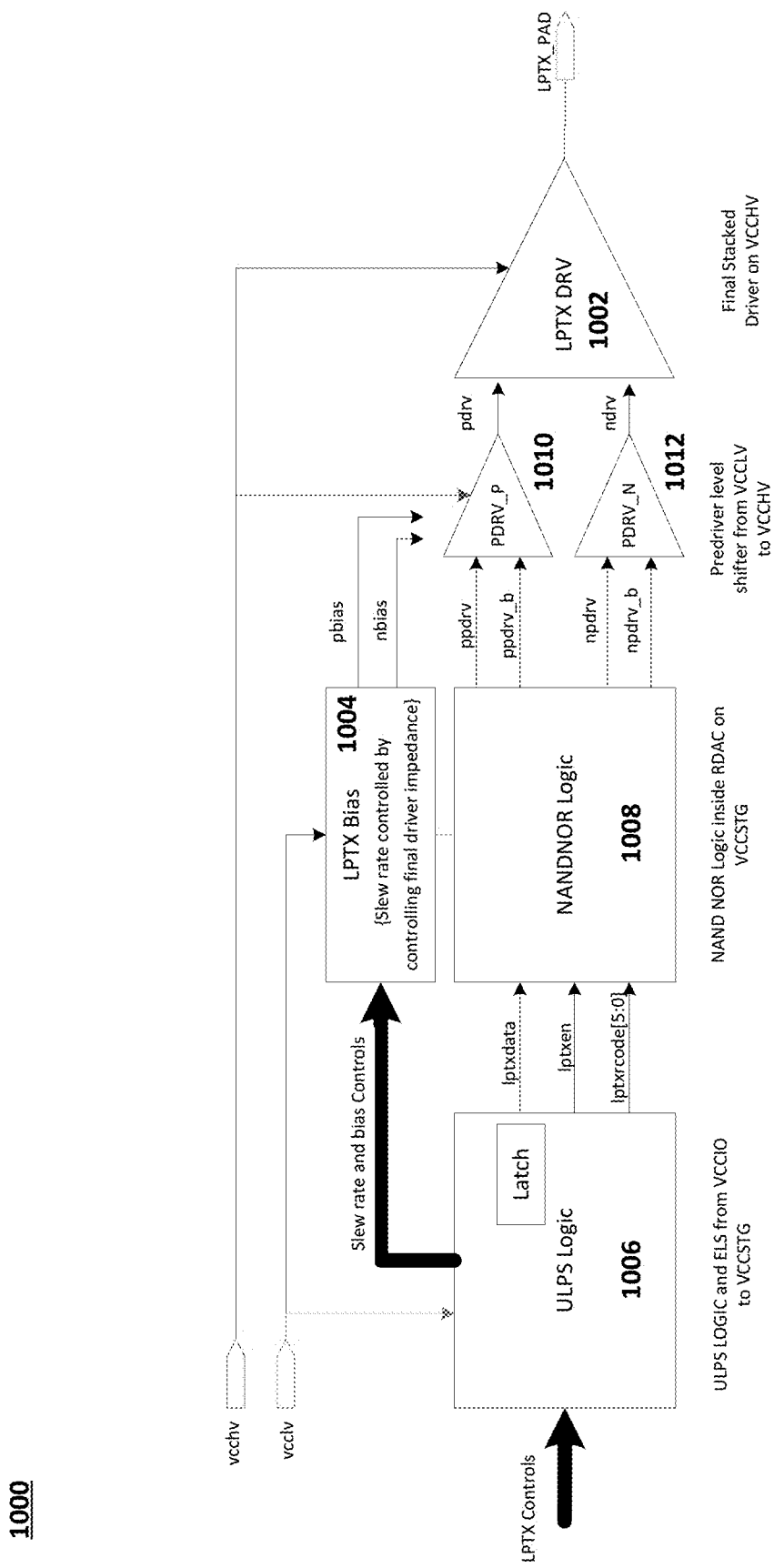
FIG. 10 is a schematic diagram of an example stacked frontend CMOS driver in accordance with embodiments of the present disclosure.

MIPI-DSI LPTX is used for handshake operations between MIPI-DSI panel and MIPI IO. The LPTX signaling is at 10 MBPS with a VOH requirement by spec of 1.1V to 1.3V. FIG. 10 is a schematic diagram of an example stacked frontend CMOS driver 1000 in accordance with embodiments of the present disclosure. The CMOS driver can be configured for CMOS signaling powered by VCCHV, which is maintained >=1.1V and <=1.3V. The LPTX block 1002 consists of LPTX Logic which primarily controls the LPTX pad status to HiZ during HSTX operation, driving the final PAD status to LP00 state during low power state and passing functional data during LPTX operation. The bias block 1004 provides necessary voltages for stacked level shifters and final drivers operating on 1.2V supply The stacked devices in final driver are biased for two purpose. In case of minimum slew rate requirement the biases are to turn on, but with voltages such that not to violate EOS limit of the devices. And in case of slew rate control enabled, the stacked devices are throttled to control the drive slopes through pbias dry and nbias dry. The predrivers 1010 and 1012 are stacked level shifters and are biased to meet EOS limits. The circuit implementation of LPTX is shown in FIG. 11.

Figure 11:
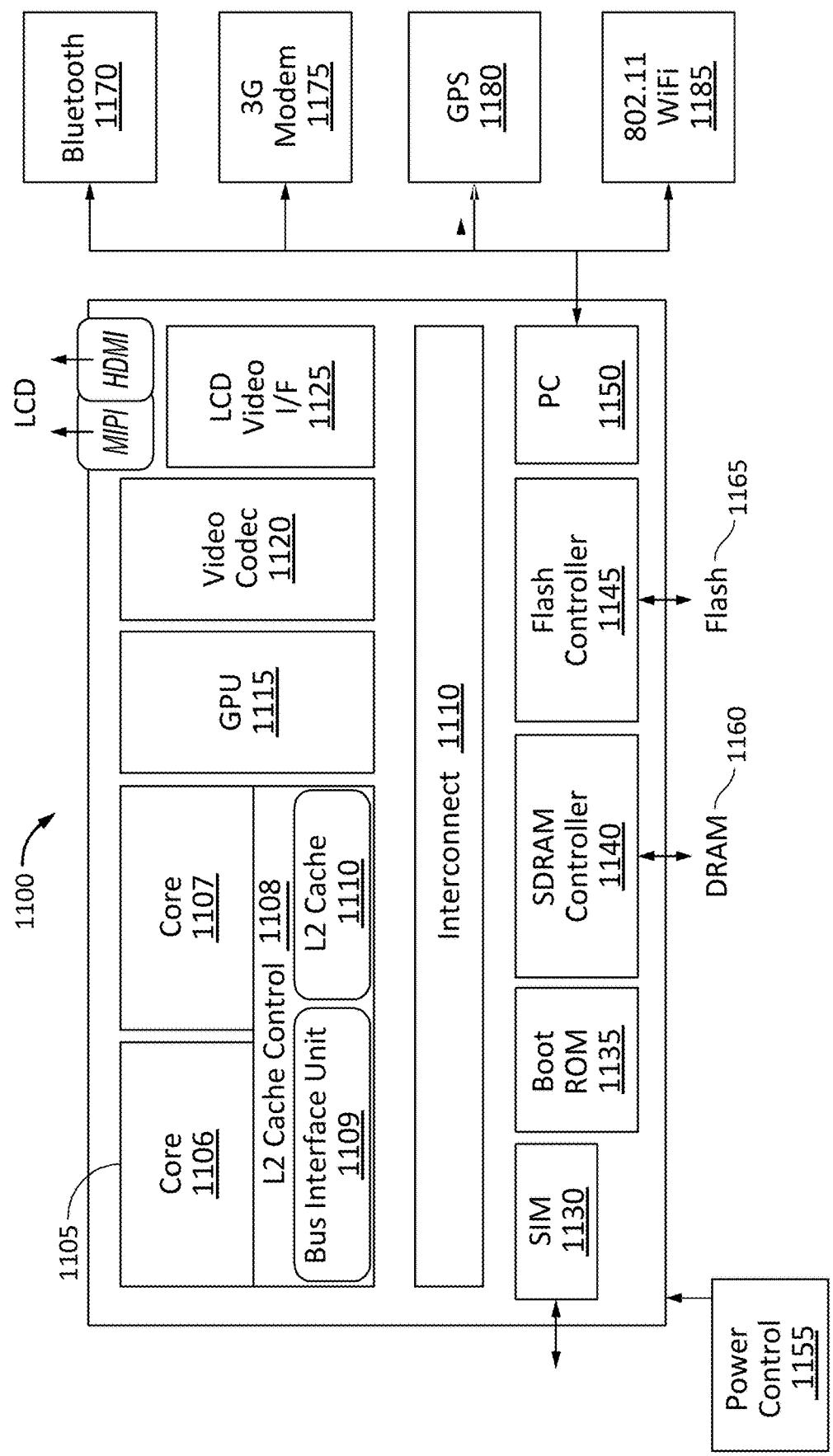
FIG. 11 illustrates another embodiment of a block diagram for a computing system.

Turning next to FIG. 11, an embodiment of a system on-chip (SOC) design in accordance with the disclosures is depicted. As a specific illustrative example, SOC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Similar to the discussion above, cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure.

Interface 1110 provides communication channels to the other components, such as a Subscriber Identity Module (SIM) 1130 to interface with a SIM card, a boot rom 1135 to hold boot code for execution by cores 1106 and 1107 to initialize and boot SOC 1100, a SDRAM controller 1140 to interface with external memory (e.g. DRAM 1160), a flash controller 1145 to interface with non-volatile memory (e.g. Flash 1165), a peripheral control Q1650 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein.

In addition, the system illustrates peripherals for communication, such as a Bluetooth module 1170, 3G modem 1175, GPS 1180, and WiFi 1185. Note as stated above, a UE includes a radio for communication. As a result, these peripheral communication modules are not all required. However, in a UE some form a radio for external communication is to be included.

Figure 12:
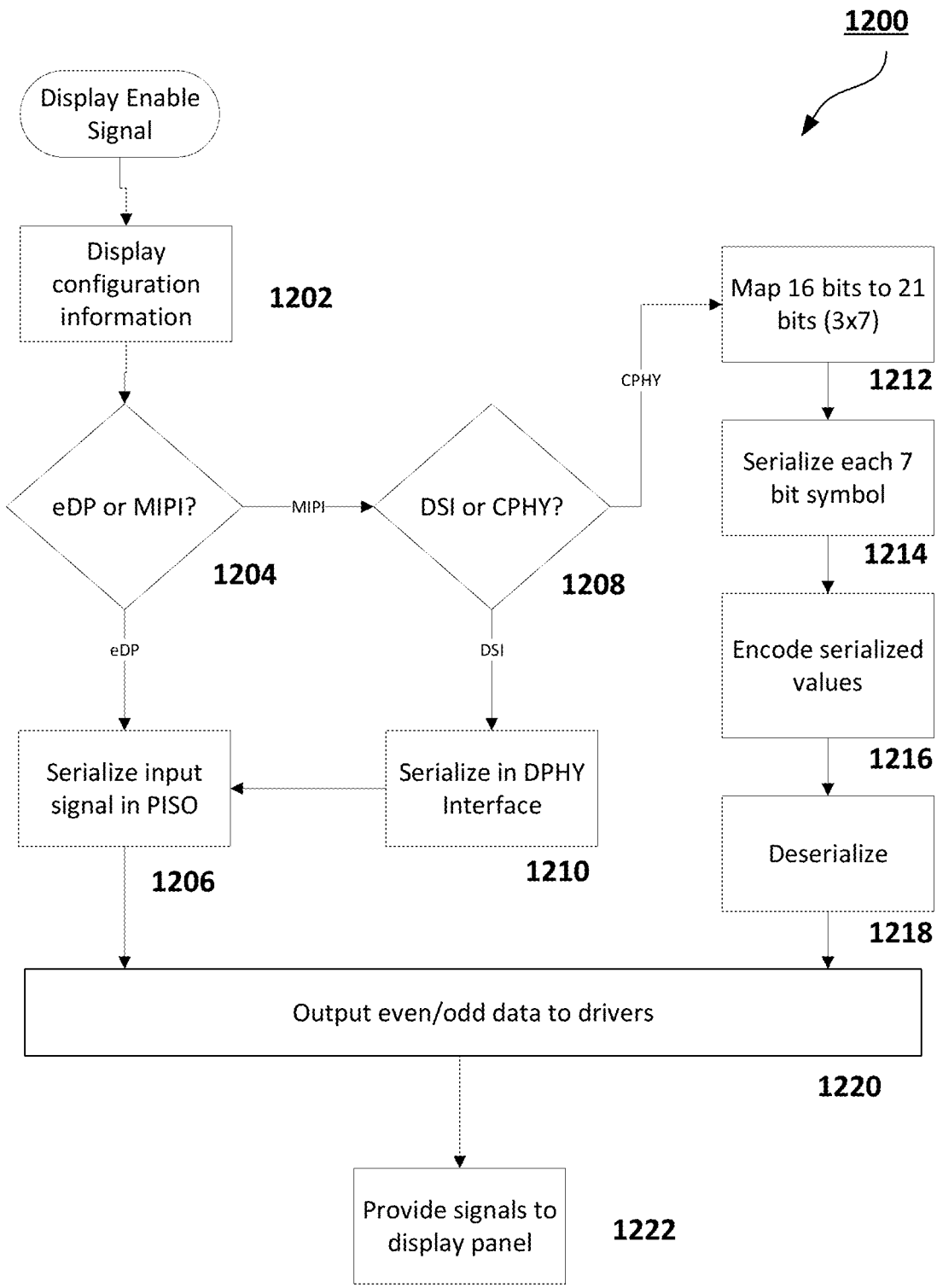
FIG. 12 is a process flow diagram for processing a display signal in a combination CPHY/DSI/eDP circuit in accordance with embodiments of the present disclosure.

FIG. 12 is a process flow diagram for processing a display signal in a combination CPHY/DSI/eDP circuit in accordance with embodiments of the present disclosure. At the outset, a display enable signal is received at a display controller. Display configuration information can also be received (1202). The display configuration information can be set by a register value at start-up. It can be determined based on a preset information defining the display protocol whether the signal is an eDP signal or a MIPI-compliant signal (1204). If the signal is an eDP-compliant signal, then the eDP-compliant signal can be directed to a parallel input/serial output (PISO) serializer circuit for serialization (1206). If the signal is a MIPI-compliant signal, it can be determined whether the signal is a DSI-compliant signal or a CPHY-compliant signal (1208). If the signal is a DSI-compliant signal, then the signal is directed to a DPHY interface for serialization of a 16 bit signal (1210), and then directed to the PISO for serialization (1206).

If the signal is a CPHY-compliant signal, a trio can be formed from the CPHY-compliant signal. For example, the signal can be directed to a 16 bit encoder logic. The encoder logic can map the 16 bit signal to a 21 bit signal to form a trio of 7 bit data signals (3*7 symbols) (1212). Each 7 bit symbol can be serialized (1214) and encoded (1216). The encoded symbols can be deserialized (1218) and sent to the multiplexer. The multiplexer can direct one of the eDP, DSI, or CPHY signal to the analog front end drivers (1220). The drivers can then output the display signals to an external display panel (1222).

Figure 13:
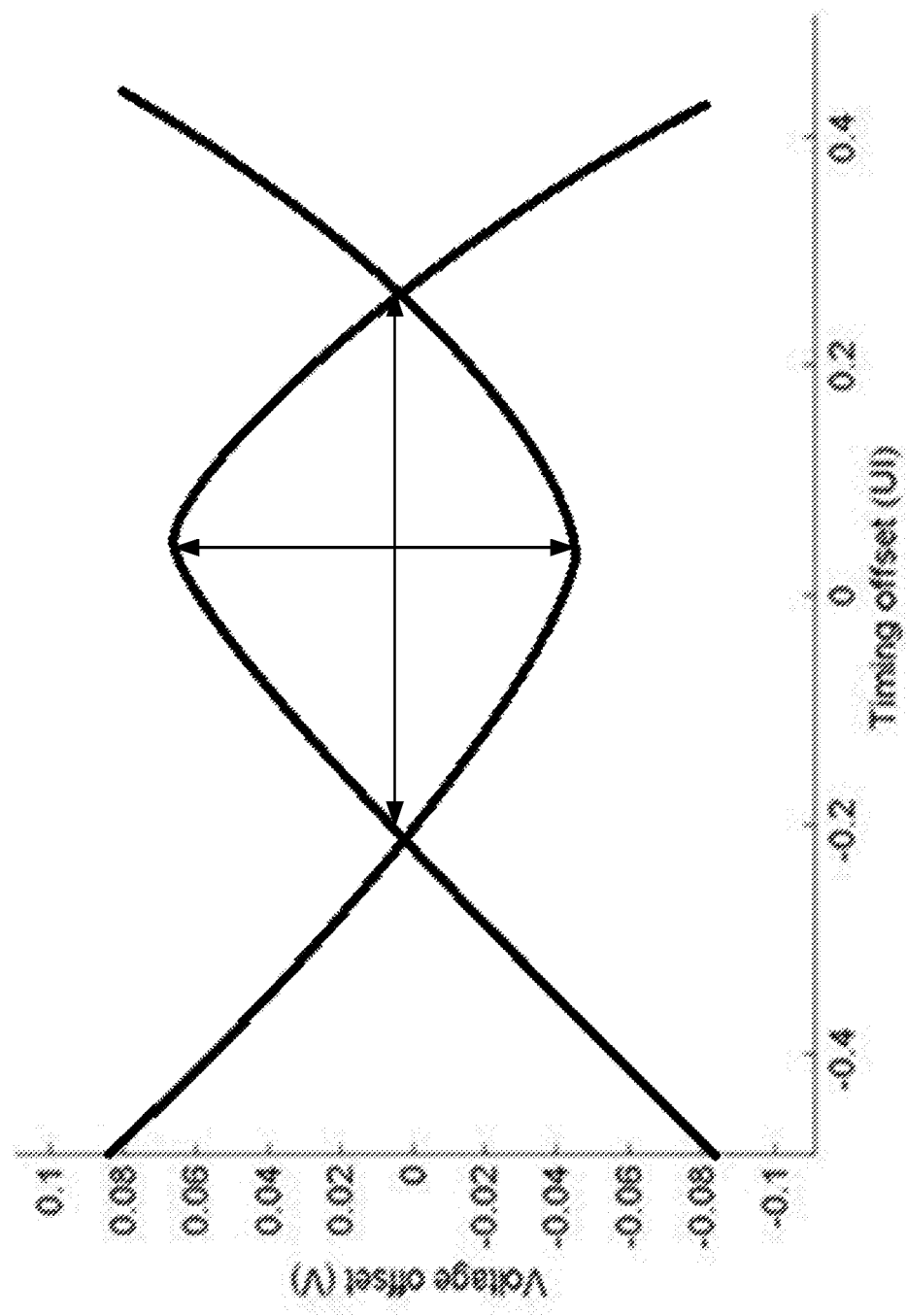
FIG. 13 is a graphical illustration of a bit error rate (BER) eye diagram for a short channel combination circuit in accordance with embodiments of the present disclosure.
Figure 14:
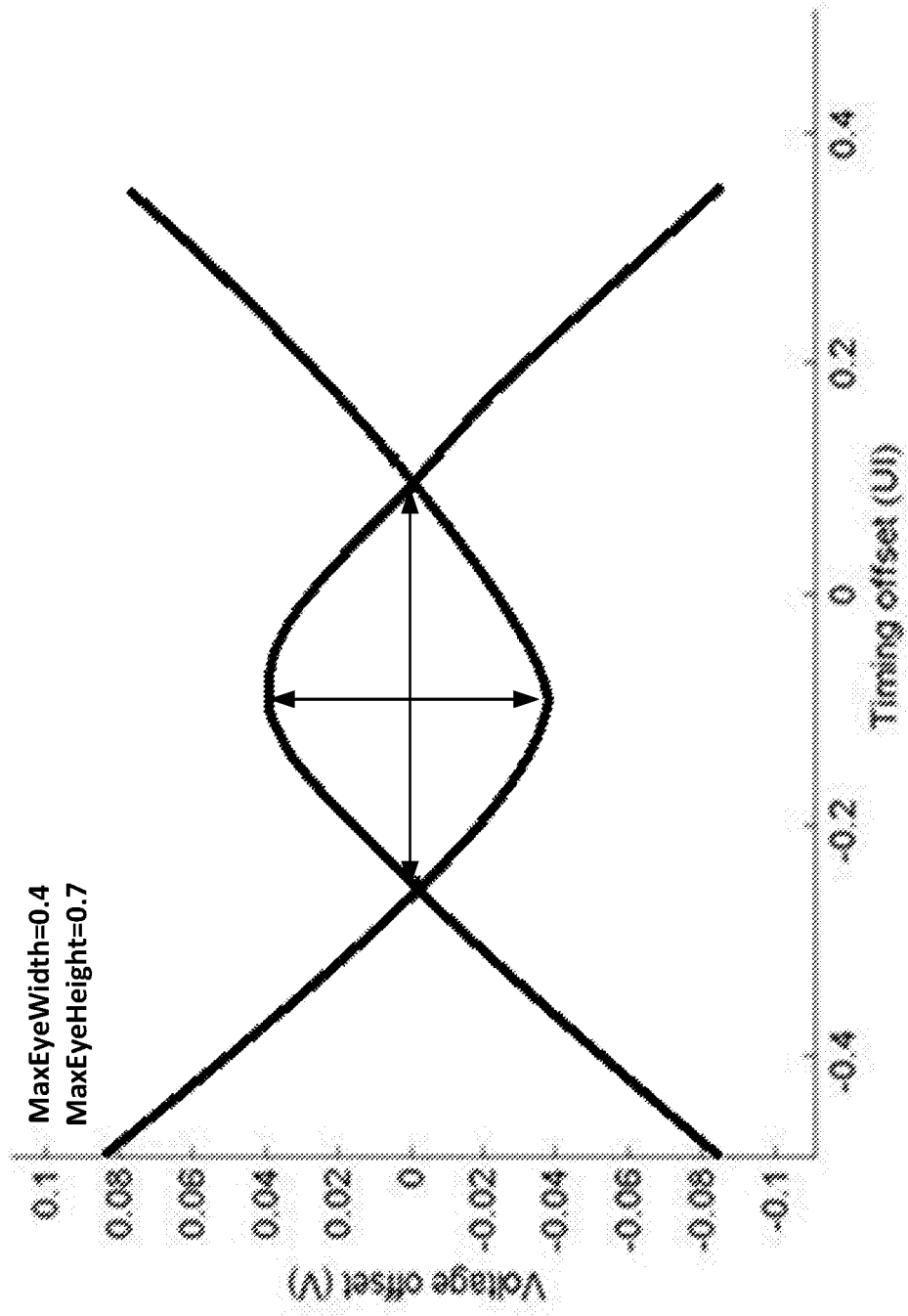
FIG. 14 is a graphical illustration of a bit error rate (BER) eye diagram for a long channel combination circuit in accordance with embodiments of the present disclosure.

FIG. 13 is a graphical illustration of a bit error rate (BER) eye diagram 1300 for a short channel combination circuit in accordance with embodiments of the present disclosure. FIG. 14 is a graphical illustration of a bit error rate (BER) eye diagram 1400 for a long channel combination circuit in accordance with embodiments of the present disclosure. The above combination circuit architecture performance is defined by the electrical parameters and channel requirements of 8.1 Gbps as the superset. This is taken as the baseline for the signal integrity analysis. The swing, pad capacitance, and the practical channel lengths sensitivity analysis was done to define the transmitter parameters that caters to the different segments (Phone, tablet, wearable's and IOT). The challenge was to meet the pad capacitance and the swing to maintain the combination framework, which will lower power (DPHY, CPHY) and increase performance (eDP 8.1 Gbps). The complex RX EQ in the eDP specification to support minimum and maximum channel requirements of the segments which was considered to target the swing and the CPAD requirements. FIGS. 13 & 14 illustrate the respective BER eye diagrams for the combo CDE PHY configured as eDP. The specification for eDP 8.1 Gbps is EH=70 mV, EW=0.35 UI.

The signal integrity analysis defined the spec for the circuits to be as pad capacitance of 1.5 pF and still meet the channel requirements with a minimum swing of 300 mV and maximum swing of 700 mV in the eDP combo mode. The TX conformance requirements for MIPI DPHY and CPHY is met from the TX side as per the MIPI Alliance spec from the circuit side with reference channel models.

Overall this innovation combines features of CDE in single PHY without compromising on performance while providing flexibility for OEM for configurability and saving die area/package pins.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A physical layer circuit element (PHY) comprising:
    a parallel input/serial output (PISO) circuit element configured to receive one of eDisplayPort (eDP) signals or Mobile Industry Processor Interface (MIPI) display serial interface (DSI) signals; and
    a multiplexer circuit element configured to receive an output from the PISO and a MIPI CPHY signal and output even and odd data signals corresponding to one of a eDP signal, a MIPI DSI signal, or a MIPI CPHY signal.

2. The physical layer circuit element of claim 1, further comprising:
    an analog front end (AFE); wherein
    the multiplexer circuit outputs even and odd data signals corresponding to one of the eDP signal, the MIPI DSI signal, or the MIPI CPHY signal to the AFE.

3. The physical layer circuit element of claim 2, wherein the AFE comprises:
    a high speed transmission data path comprising a serializer and a predriver downstream of the serializer.

4. The physical layer circuit element of claim 2, wherein the AFE comprises a power gate and a low drop out circuit element downstream of the power gate, the power gate and low drop out circuit configured to cause a high speed driver circuit to configure into a low power configuration.

5. The physical layer circuit element of claim 2, wherein the AFE comprises an electrical overstress protection circuit downstream of a highspeed driver.

6. The physical layer circuit element of claim 2, wherein the AFE comprises a low power transmission (LPTX) data pathway to support MIPI sideband transmissions.

7. The physical layer circuit element of claim 1, wherein the multiplexer circuit comprises:
    a first input to receive a CPHY data signal; and
    a second input to receive a serialized eDP or DSI signal; and
    an output to output data signals to an analog front end driver.

8. The physical layer circuit element of claim 7, wherein the CPHY data signal comprises an encoded CPHY data signal.

9. The physical layer circuit element of claim 7, wherein the multiplexer circuit receives even and odd data pairs from the PISO.

10. A physical layer system comprising:
    a Mobile Industry Processor Interface (MIPI) display serial interface (DSI) logic element configured to receive data compliant with a MIPI DSI protocol and output a differential pair signal to a parallel input/serial output (PISO) circuit element;
    a CPHY logical element comprising:
        a mapper circuit to map a 16 bit input to a 21 bit output, mapper circuit comprising three 7 bit outputs;
        for each 7 bit output, a serializer circuit element;
        an encoder downstream of the serializer circuit element; and
        a deserializer circuit element to output a trio to a multiplexer circuit element;
    wherein:
        the multiplexer circuit element is downstream of the PISO and is coupled to an output of the PISO, the multiplexer configured to output one of the MIPI DSI or the CPHY data to an display driver.

11. The physical layer system of claim 10, wherein the parallel input/serial output (PISO) circuit element is to receive one of eDisplayPort (eDP) signals or MIPI display serial interface (DSI) signals; and
    the multiplexer circuit element configured to receive an output from the PISO and a MIPI CPHY signal and output even and odd data signals corresponding to one of a eDP signal, a MIPI DSI signal, or a MIPI CPHY signal.

12. The physical layer system of claim 11, further comprising:
    an analog front end (AFE); wherein
    the multiplexer circuit to output even and odd data signals corresponding to one of the eDP signal, the MIPI DSI signal, or the MIPI CPHY signal to the AFE.

13. The physical layer system of claim 12, wherein the AFE comprises:
    a high speed transmission data path comprising a serializer and a predriver downstream of the serializer.

14. The physical layer system of claim 12, wherein the AFE comprises a power gate and a low drop out circuit element downstream of the power gate, the power gate and low drop out circuit configured to cause a high speed driver circuit to configure into a low power configuration.

15. The physical layer system of claim 12, wherein the AFE comprises an electrical overstress protection circuit downstream of a highspeed driver.

16. The physical layer system of claim 12, wherein the AFE comprises a low power transmission (LPTX) data pathway to support MIPI sideband transmissions.

17. The physical layer system of claim 11, wherein the multiplexer circuit comprises:
    a first input to receive a CPHY data signal; and
    a second input to receive a serialized eDP or DSI signal; and an output to output data signals to an analog front end driver.

18. The physical layer system of claim 17, wherein the CPHY data signal comprises an encoded CPHY data signal.

19. The physical layer system of claim 17, wherein the multiplexer circuit receives even and odd data pairs from the PISO.

20. A method comprising:
receiving a display signal at a display controller;
determining that the signal is one of an eDisplayPort (eDP)-compliant signal, a display serial interface (DSI)-compliant signal, or a CPHY-compliant signal;
for a eDP-compliant signal or a DSI-compliant signal:
  forming a differential pair;
  serializing the differential pair; and
  directing the differential pair to a multiplexer;
for a CPHY-compliant signal:
  forming a trio of data symbols;
  encoding the trio of data symbols; and
  directing the trio of data symbols to the multiplexer; and
outputting from the multiplexer a serialized set of display data symbols to one or more display drivers;
the method further comprising:
receiving at the multiplexer eDP or DSI differential pairs as an output from a parallel input to serial output (PISO) circuit element or a trio of CPHY symbols; and
outputting to a display driver one of the eDP or DSI differential pairs or the CPHY symbols.

21. The method of claim 20, further comprising:
serializing the eDP or DSI signals in a parallel input to serial output (PISO) circuit element.

22. The method of claim 21, wherein the DSI signals are serialized by a DPHY-compliant interface prior to serialization in the PISO.

23. The method of claim 20, wherein the CPHY symbols are serialized, encoded, and deserialized.

24. The method of claim 20, wherein forming a trio comprises:
receiving a 16 bit input signal;
mapping the 16 bit input signal to a 21 bit input signal;
forming 3 7 bit symbols; and
serializing each of the 3 7 bit symbols prior to encoding each of the 3 7 bit symbols.

* * * * *